(No Model.)
J. CUTHBERTSON.
CAN OR POT FOR MEASURING MILK, &c.
No. 366,380. Patented July 12, 1887.
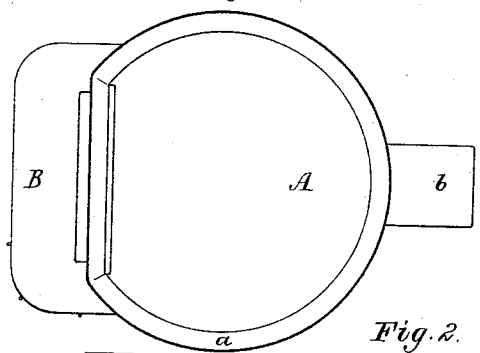
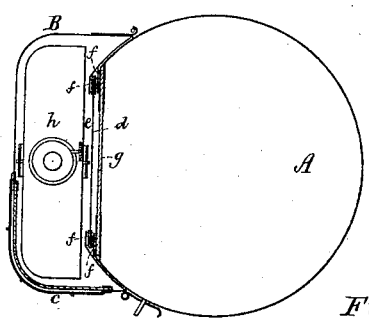
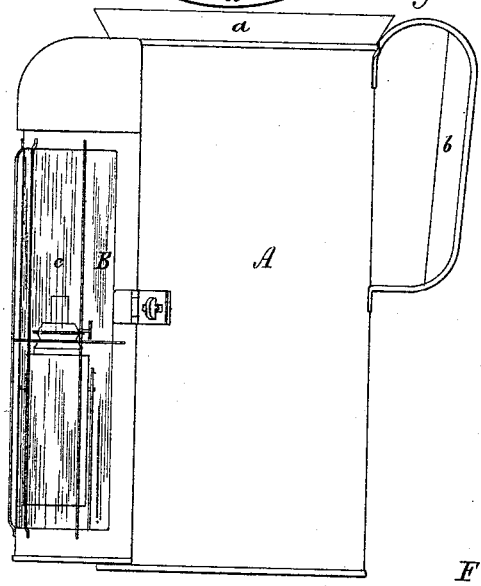
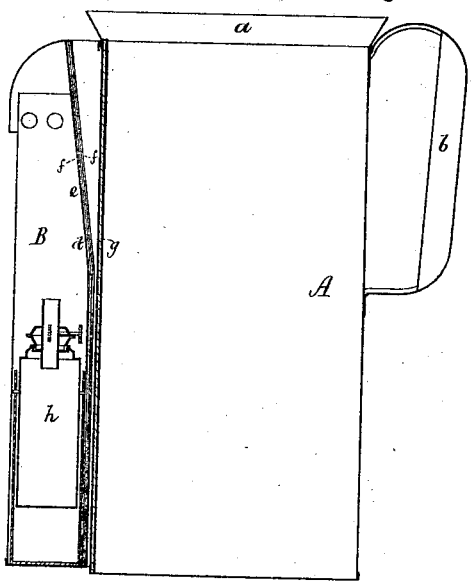
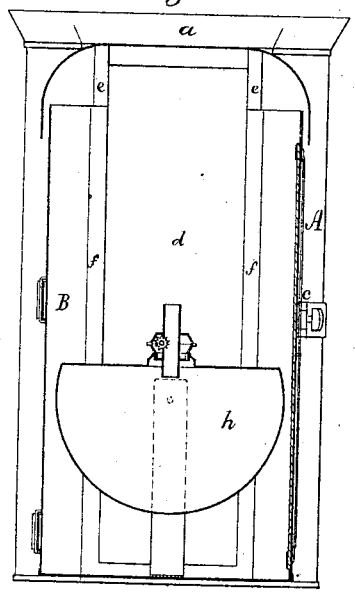
Witnesses:
S. N. Piper
Thomas St. Louis
Inventor,
John Cuthbertson,
by R. U. Gee, atty.

UNITED STATES PATENT OFFICE.

JOHN CUTHBERTSON, OF LOWELL, MASSACHUSETTS, ASSIGNOR OF ONE-HALF TO ALFRED J. HOWE, OF SAME PLACE.

CAN OR POT FOR MEASURING MILK, &c.

SPECIFICATION forming part of Letters Patent No. 366,380, dated July 12, 1887.

Application filed February 24, 1887. Serial No. 228,710. (No model.)

*To all whom it may concern:*

Be it known that I, JOHN CUTHBERTSON, a subject of the Queen of Great Britain, and a resident of Lowell, in the county of Middlesex, of the Commonwealth of Massachusetts, have invented a new and useful Improvement in Cans or Pots for Measuring Milk or other Liquids; and I do hereby declare the same to be described in the following specification, and represented in the accompanying drawings, of which—

Figure 1 is a top view; Fig. 2, a side elevation; Fig. 3, a vertical section; and Fig. 4, a horizontal section, taken through the measuring-pot and its lantern, to be described. Fig. 5 is a vertical section of its lantern, such section being taken through the pendulous lamp of such lantern.

The nature of my invention is defined in the claims hereinafter presented.

In carrying out my improvement or invention I combine with a measuring can or pot a lantern applied to the side of such can or pot, and I provide the can or pot with a glass pane in its side next the lantern, in order that the rays of light from the lamp of the lantern may pass into and through such pane and illuminate the interior of the can or measuring-pot; from which it will be seen that a milkman provided with my invention can in the night-time use the lantern both for illuminating his way and the interior of the measuring vessel, the object of letting light into the measuring-vessel being to enable the interior of it to be seen to advantage by a person while pouring milk into it in the dark or night-time, and as a consequence readily ascertain when he may have supplied the vessel with the required quantity or measure.

In the drawings, A denotes a common quart pot or vessel—such as used by milkmen or grocers to measure milk or other liquids—such vessel being provided with a nose, *a*, and a handle, *b*.

Attached or hinged to one side of the said pot or vessel, so as to be readily separable from it, is a lantern, B, having in one or more of its sides a pane, *c*, of glass, and in the side next the measuring-vessel a pane, *d*, of transparent mica or other suitable material, the lantern in one side having an opening, *e*, and to such opening a door, *f*.

In that side of the measuring can or pot which is next to the lantern is an opening filled with a glass pane, *g*, that extends from the bottom to the top, or thereabout, of the vessel, the pane being fitted water-tight in the said side. Furthermore, the lamp *h* of the said lantern has a semi-cylindrical body, which at its axis is pivoted in the lantern-case, so as to maintain its horizontality when the can or measuring-vessel is tipped for pouring from it milk or a liquid. Like ordinary measuring cans or pots, this one is to have marks, or studs, or other proper devices within it to indicate fractional parts of the amount of liquid the vessel may hold.

I claim—

1. The combination, with a measuring can or pot having a glass pane or transparent medium in and down one side of it, of a lantern applied to such side, and constructed and arranged so as to enable rays of light proceeding from the flame of the lamp of such lantern to pass through such pane or medium and illuminate the interior of the said can or pot, as set forth.

2. The combination, with a liquid-measuring pot or vessel having one side permeable to light, or provided with a pane of glass inserted in such side, of a lantern fixed to such side and constructed and arranged so as to enable rays of light from the lamp of such lantern to pass through the said pane or light-permeable side into the interior of the vessel, and other rays of light from such lamp to pass through one or more sides of the lantern into the surrounding atmosphere, all being substantially as set forth.

3. The combination, with a liquid-measuring pot or vessel having one side permeable to light, or provided with a pane of glass inserted in such side, of a lantern fixed to such side and provided with a pendulous lamp, as explained, and constructed and arranged so as to enable rays from the flame of such lamp to pass into the interior of the said liquid-measuring vessel or pot, all being substantially as set forth.

JOHN CUTHBERTSON.

Witnesses:
MARTIN L. HAMBLET,
CHARLES F. WORCESTER.